(12) United States Patent
Denteneer et al.

(10) Patent No.: US 8,730,874 B2
(45) Date of Patent: May 20, 2014

(54) METHOD OF TRANSMITTING FRAMES IN A MESH NETWORK, MESH DEVICE AND MESH NETWORK THEREFOR

(75) Inventors: Theodorus Jacobus Johannes Denteneer, Eindhoven (NL); Guido Roland Hiertz, Aachen (DE); Harald Radke, Aachen (DE); Bernhard Walke, Wuerselen (DE)

(73) Assignee: Koninklijke Philips N.V., Eindhoven (NL)

( * ) Notice: Subject to any disclaimer, the term of this patent is extended or adjusted under 35 U.S.C. 154(b) by 163 days.

(21) Appl. No.: 13/143,857

(22) PCT Filed: Jan. 14, 2010

(86) PCT No.: PCT/IB2010/050142
§ 371 (c)(1),
(2), (4) Date: Jul. 8, 2011

(87) PCT Pub. No.: WO2010/082170
PCT Pub. Date: Jul. 22, 2010

(65) Prior Publication Data
US 2011/0274048 A1    Nov. 10, 2011

(30) Foreign Application Priority Data

Jan. 19, 2009    (EP) .................................... 09305043

(51) Int. Cl.
*H04W 4/00*    (2009.01)
(52) U.S. Cl.
USPC .......................................................... 370/328

(58) Field of Classification Search
None
See application file for complete search history.

(56) References Cited

U.S. PATENT DOCUMENTS

| | | | |
|---|---|---|---|
| 2003/0174652 A1* | 9/2003 | Ebata ............................ | 370/235 |
| 2005/0270974 A1* | 12/2005 | Mayhew ........................ | 370/229 |
| 2008/0063004 A1* | 3/2008 | Himberger et al. ........... | 370/413 |
| 2009/0003371 A1 | 1/2009 | Cheng | |
| 2009/0161684 A1* | 6/2009 | Voruganti et al. ............. | 370/412 |

OTHER PUBLICATIONS

Li-Hung Liao et al., "Location-Independent Scheduling Mechanism for Multi-hop Wireless Backhaul Networks" Vehicular Technology Conference, 2007, VTC2007-Spring. IEEE 65TH, IEEE, PI, Apr. 1, 2007, pp. 1147-1151, XP031092809.
Casetti C et al., "Fair Relaying and Cooperation in Multi-rate 802.11 Networks", Vehicular Technology Conference, 2005. VTC 2005-Spring. 2005 IEEE 61ST, IEEE, Piscataway, NJ, USA, vol. 3, May 30, 2005, pp. 2033-2036, XP010855783.

* cited by examiner

*Primary Examiner* — John Blanton
(74) *Attorney, Agent, or Firm* — Larry Liberchuk

(57) ABSTRACT

The present invention relates to a method for transmitting frames from a transmitting mesh device to a receiving mesh device in a mesh network, comprising: storing frames received in the transmitting mesh device from a source mesh device and intended for a destination mesh device in a relay queue, the source mesh device and the destination mesh device being different from the transmitting device, storing frames generated by the transmitting mesh device in a local queue, different from the relay queue, selecting a frame from the relay queue or local queue based on a predetermined scheduling strategy, —transmitting the selected frame to the receiving mesh device.

12 Claims, 3 Drawing Sheets

METHOD OF TRANSMITTING FRAMES IN A MESH NETWORK, MESH DEVICE AND MESH NETWORK THEREFOR

FIELD OF THE INVENTION

The present invention relates wireless mesh networks (WMNs), and more particularly to a method for transmitting frames in a mesh networks.

This invention is, for example, relevant for networks wherein mesh devices interconnect and each device may work as a wireless router for forwarding frames received from a source mesh devices, and intended for a destination device.

BACKGROUND OF THE INVENTION

In conventional wireless mesh networks, mesh devices have the ability to perform several types of operations:
- forwarding frames received from a source device and intended for a destination device,
- consuming frames, received from a source device, and used during sequence of operations of local applications of the device, and
- They can generate frames during operating sequences of local applications.

These operations do not mutually exclude each other, which means that applications running on a mesh device may generate frames concurrently to frames that the mesh devices receive and have to forward In most existing implementations for WMNs, both types of frames, i.e. generated frames and received frames are handled equally when it comes to transmitting them to a receiving node. Indeed, frames of local origin and frames of remote origin are stored in the same transmission queue, and are sorted and transmitted according to their order of occurrence.

However, frames of both origins do not experience the same loss before reaching the transmission queue, depending on their origin. Frames generated by local applications do not traverse a transmission medium and, accordingly, do not experience any frame loss. For these frames, frame dropping occurs only if a lower layer buffer is full, which means that, in most cases, local applications easily store their frames in the local transmission queues.

On the contrary, frames coming from another mesh device have to traverse the wireless medium, which means that they are less likely to be successfully stored in the mesh device's transmission queue, because they may experience frame loss during crossing of the medium. Thus, the transmission queue may contain more generated frames than received ones.

Moreover, transmission rate on the wireless medium is limited, whereas applications locally running at mesh devices may generate frames at a higher rate. Consequently, both the limited incoming traffic rate and the reduced reception success probability of frames received from external devices increase the probability for these frames to be dropped at the transmitting mesh devices.

In addition, if p denotes the frame dropping probability on a single transmission link, the probability of a successful transmission over a chain of n equal and independent links is $(1-p)^n$. Thus, the frame dropping probability increase with every additional hop, which means that frame transmissions of devices that are close to the intended destination experience better performance than frame transmissions that still have to traverse a large number of hops.

Accordingly, it appears that current implementations using equal treatments for both types of frames present major drawbacks in always giving precedence to frames of local origin, thus leading to bad performance of multi-hop transmissions, and also by offering different qualities of service and overall performance to users situated in different locations in the network.

SUMMARY OF THE INVENTION

It is an object of the invention to propose a method for transmitting frames in a wireless mesh networks, overcoming at least some of the drawbacks above-mentioned.

More particularly, it is an object of the invention to propose several scheduling mechanisms for providing priority to frames received by the transmitting mesh device, and that are to be relayed.

It is another object of the invention to provide a transmission mechanism depending on the position of the frame in the total propagation path.

It is also an object of the invention to propose mechanisms for storing received frames in a transmitting mesh device, before transmission.

Yet another object is to propose a method able to deal with frames containing different types of data.

To this end, a method for transmitting frames from a transmitting mesh device to a receiving mesh device in a mesh network according to the invention comprises the following steps:
- frames received in the transmitting mesh device from a source mesh device and intended for a destination mesh device are stored in a relay queue, the source mesh device and the destination mesh device being different from the transmitting device,
- frames generated by the transmitting mesh device are stored in a local queue, different from the relay queue,
- a frame is selected by a scheduler included in the mesh device, from the relay queue or local queue, based on a predetermined scheduling strategy,
- the selected frame is then transmitted to the receiving mesh device.

Within the meaning of the present invention, a queue is a set of storage slots in a mesh device, wherein frames are stored by order of arrival. Such a queue is generally implemented in hardware, and thus has a limited size. However, in advantageous embodiments of the present invention, a mesh device comprises several queues, the total number of storage slots is limited by hardware constraints, but the size of each queue may vary.

All along the present specification, the expression "local queue" designates a queue used for storing frames generated by local applications in the mesh device, and "relay queue" designates a queue used for storing frames received from another mesh device of the network, and intended to be only forwarded by the transmitting mesh device.

Using these two types of queues makes it possible, in the present invention, to differentiate frames of local origin from frames of remote origin, and thus to schedule transmission of these frames in order to overcome the drawbacks of conventional systems where local frames are often given precedence to received frames.

In a particular embodiment, the step of selecting a frame comprises:
- in case both the relay queue and the local queue contain at least one frame, selecting the oldest frame from the relay queue with a probability equal to p, p being a positive number less than 1, and the oldest frame from the local queue with a probability equal to $(1-p)$,
- in case one of the queues is empty, selecting the oldest frame from the other queue.

In this way, the mesh devices may be configured by a user, by initially determining the value of p, this value being chosen as equal to 1 in a specific embodiment.

Thus, it means that among 10 frames transmitted by the mesh device, 10*p of them would be forwarded frames, and 10*(1−p) of them would be generated by local applications.

In yet another embodiment, the predetermined scheduling strategy takes into account the number of hops a frame in the relay queue has already traversed and/or still has to traverse within the mesh network. Such a feature makes it possible to guarantee that frames with a high hop count, i.e. frames whose transmission is almost completed, have a high likelihood to be successfully forwarded.

In some architecture of mesh devices, as previously mentioned, the relay queues and local queues are defined as software queues each comprising at least one storage slot and a storage slot can be assigned either to one queue or to another, thus leading to flexible sizes of the different queues.

In this case, the step of storing a frame in a relay queue comprises, when all the storage slots of the relay queue are occupied:
- assigning a free storage slot from a local queue to the relay queue, and, if all local queues are full,
- dropping a frame from the local queue,
- assigning the released storage slot to the relay queue,
- storing the frame in the free storage slot of the relay queue.

Moreover, 802.11 standard defines several traffic categories, depending on types of data who have to be treated differently when it comes to prioritize the transmission. In this view, in a particular embodiment of the present invention, mesh device comprises a first set of relay queues, respectively a second set of local queues, and wherein the received frames, respectively the generated frames, are stored in any queue of the first set, respectively the second set, this storage depending, for example, on the type of data contained in the frame to be stored.

In some examples of this embodiment, the predetermined scheduling comprises selecting, for each type of data, the oldest frame from the relay queue corresponding to the type of data, with a probability $p_{type}$, wherein $p_{type}$ is a positive number depending on the type.

In another example, the predetermined scheduling strategy is such that the number of packets of a single type of data sent in a row does not exceed a predetermined number. The predetermined number is, for example, determined by a user of the network.

Different queues architectures may be used for carrying out the present invention, departing from conventional mesh devices. Thus, in an exemplary embodiment, the relay queue and the local queue are placed on top of the MAC layer of the mesh network, and wherein the transmitting step comprises:
- transferring the frame for the relay queue or local queue to a final queue in the MAC layer of the network, and
- transmitting the frame from the final queue to another mesh device.

Another aspect of the invention related to a mesh device comprising:
- means for receiving frames from a source mesh device, intended for a destination mesh device,
- means for generating frames,
- means for transmitting frames,
- first storage means for storing received frames,
- second storage means for storing generated frames,
- a scheduler for selecting, from first storage means and second storage means, frames to be transmitted.

Yet another aspect of the invention relates to a wireless mesh network comprising at least one mesh device according to the invention, and carrying out a transmission method according to the invention.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
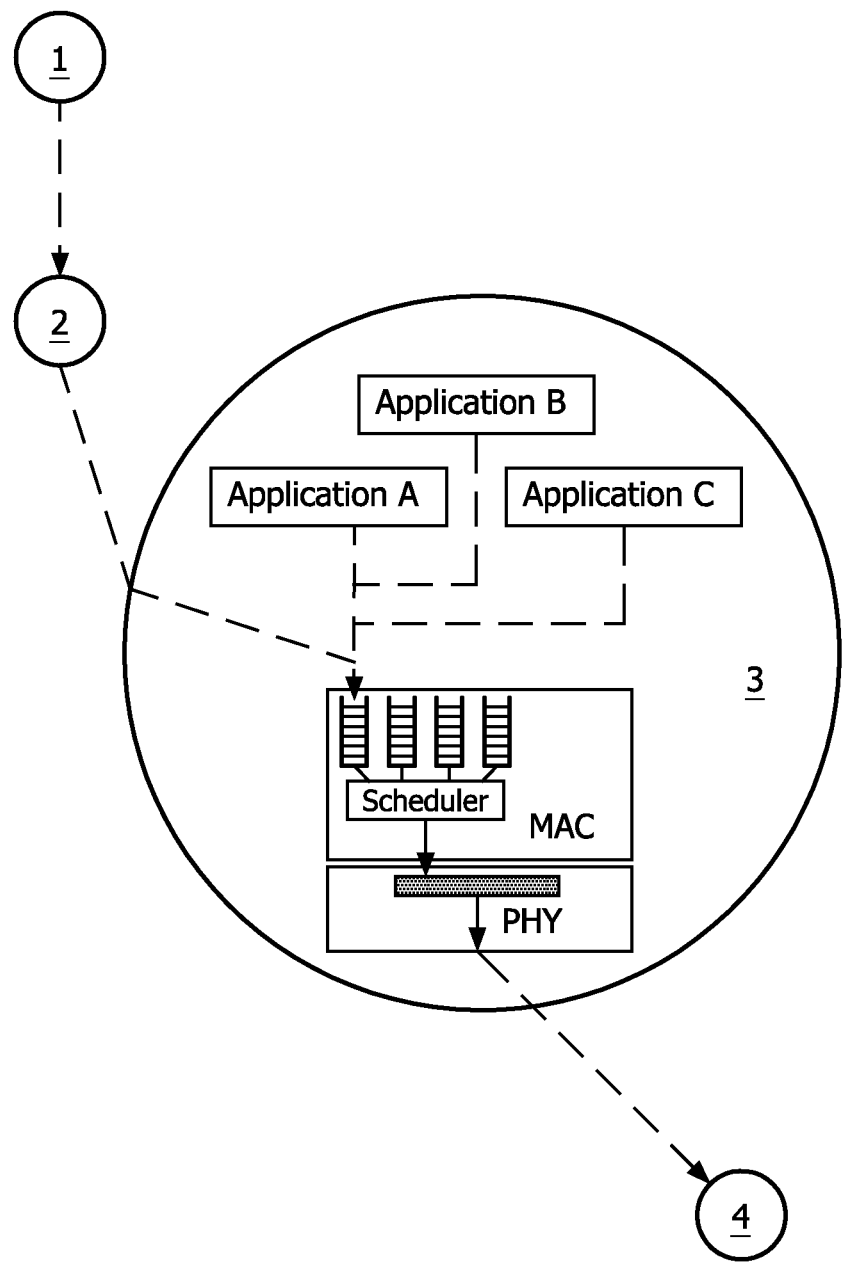
FIG. 1 is an example of mesh network implementing transmitting methods of the prior art.

FIG. 1 shows a wireless mesh network comprising a transmitting mesh device 3. This device has to transmit different types of frames:
- Frames received from mesh device 2, and
- Frames locally generated by applications A, B and C.

Among frames received from mesh device 2, some of them have to be only relayed by device 3, which means that they are not finally intended this device, but for a destination device 4. The source device of these frames, i.e. the device in which they have been generated, is device 2 or device 1. Thus, a frame may be generated at device 1 and intended for device 4, following a multi-hop transmission path.

As can be seen in FIG. 1, the mesh device 3 comprises, in the MAC layer, a queue 5 for storing frames to be transmitted via the PHY layer. However, these queues do not differentiate between frames coming from the mesh device 2 and frames coming from the local applications.

In case different queues (6, 7 and 8) are present they are used only to differentiate the type of data, namely voice data, video data, background data, but not their origin, local or remote. Thus, frame 9 transmitted by the PHY layer is chosen from queue 5 (or any other queue) by order of occurrence, thus leading to all the drawbacks previously mentioned.

The present invention provides a method in which frames are separated into different queues, based on their origin. Such a method is, for example, implemented using a mesh device as shown in FIG. 2.

In such a device, additional queues are introduced on top of the MAC layer. These queues are separated into two groups: a first set of relay queues (SET1) and a second set of local queues (SET2). Each of these sets comprises four queues, to separate frames depending on the type of data they contain, namely Voice, Video, Best Effort and Background. However, this number of queues is only exemplary, since a method according to the invention can be implemented with any number of queues.

Thus, assuming that a device as shown on FIG. 2 replaces device 3 of FIG. 1, a method according to the invention would be carried out as follows:
- frames received from device 2 are stored in a queue of SET1, depending on the data type,
- frames generated by applications A, B and C are stored in a queue of SET2, also depending on the data type.

Figure 2:
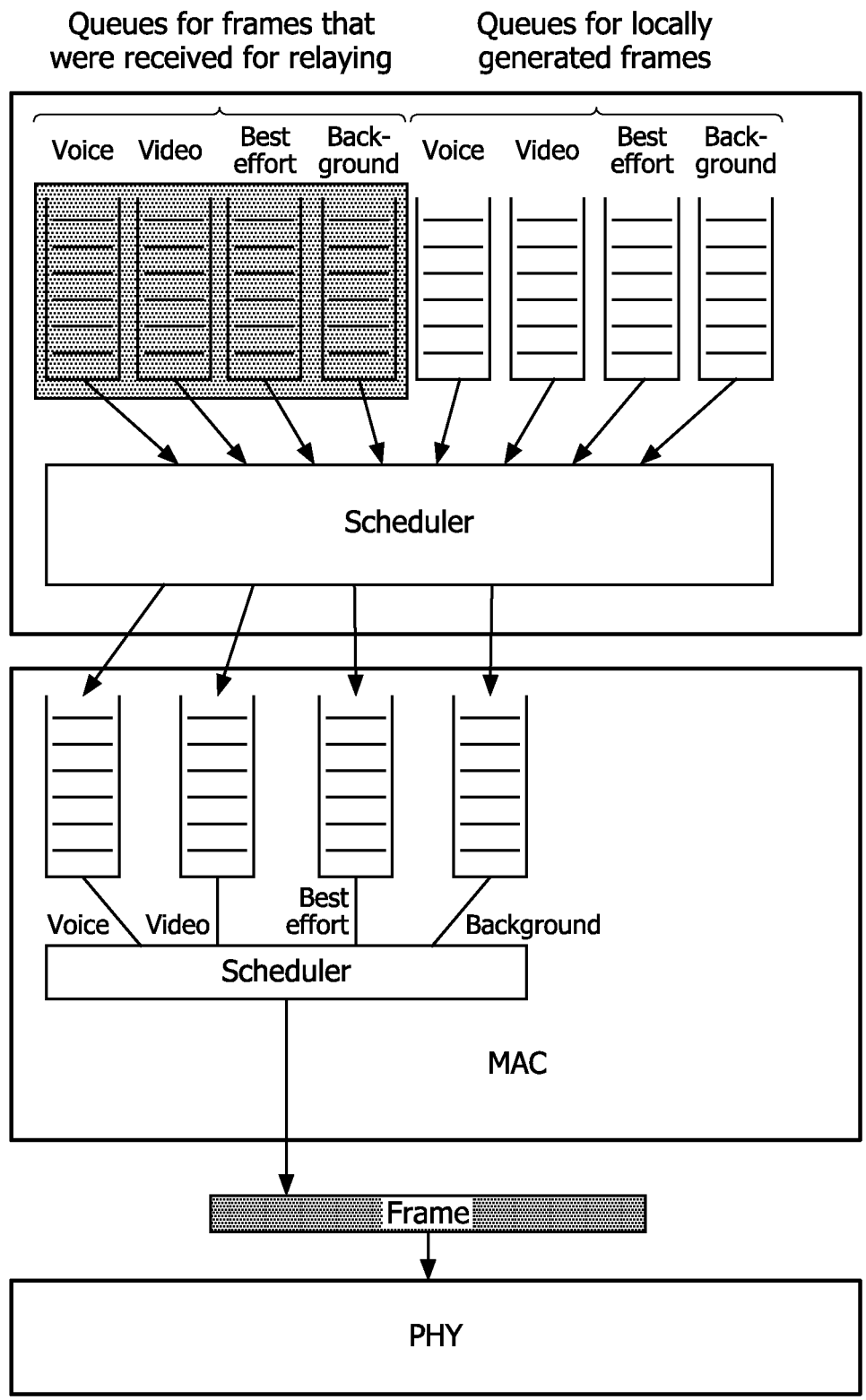
FIGS. 2 and 3 show architectures of storage means in a mesh device carrying out a transmitting method according to the invention.

Mesh device shown in FIG. 2 also comprises a scheduler 10, which is able to differentiate between frames that are generated locally and frames having to be relayed. Such a distinction can be made within each type of data.

Frames selected by the scheduler 10 are then transferred to queues situated within the MAC layer. In such a case, the MAC layer comprises as many queues as in each set of additional queues. Then, frames issued from a queue corresponding to a certain type of data are transferred to another queue corresponding to the same type of data. In the MAC layer is further implemented a second scheduler 11, for determining frames to be finally transmitted. Selection in the second scheduler is performed as in conventional systems, since the present invention relates to differentiating between received frames and generated frames, such differentiation being already performed in scheduler 10.

To perform selection of frames to be transmitted via the lower layers, scheduler 10 may implement different scheduling strategies. Those strategies can be classified into two categories: strategies related to prioritization of frames to be transmitted, thus frames situated at the head of a queue, and strategies related to storing of incoming frames, thus at the tail of a queue.

A first type of prioritization strategy is based on a predetermined probability of relayed frames to be transmitted. In such strategy, when a frame has to be transferred, the scheduler selects the oldest frame from a relay queue with a probability equal to p, where p is a positive number less than 1. In case the relay queue is empty, the scheduler selects the oldest frame in a local queue.

If there are several relay queues and several local queues, depending on the type of data in the frames, the scheduler selects, for a type of data, the oldest frame from the corresponding relay queue with a probability $p_{type}$, where $p_{type}$ is a positive number less than 1, depending on the type of data.

Another prioritization strategy is a specific embodiment of the preceding one, where the probability p always equals one. In this, case, whenever frames are present in a relay queue, the scheduler selects these frames for transmission. The scheduler allows transmission of a frame generated by local applications only if the relay queues are empty.

A second type of strategy relates to storing in queues of incoming frames, either received from another mesh device or locally generated. Indeed, the size of queues implemented are limited due to resource constraints, thus it is necessary to provide a strategy for being used when all queues are filled.

In an exemplary embodiment, queues are implemented in software, and each queue comprises at least one storage slot. In this case, a storage slot can be assigned either to one queue or to another, the total size of the queues being limited. Then when all queues are full, a frame dropping strategies has to be carried out for releasing storage slots.

A first dropping strategy called local frame dropping acts as follows, when a frame is received from an external device:
 a free storage slot of a local queue is assigned to a relay queue,
 if all local queues are also filled, a frame is dropped from a local queue, and the released storage slot is assigned to a relay queue. The dropped frame is, in an example, the oldest frame in the local queue corresponding to the same type of data as the received frame to be stored.

Another dropping strategy is based on assignment of priorities indexes to the different queues. Assuming that n denotes the number of data types that are differentiated in the network, a mesh device comprises n local queues for storing frames generated by local applications, and n relay queues for frames received from another device, and to be forwarded. Thus the mesh device comprises a total of 2*n queues. Each of them is assigned a priority index $i_{ptype,q}$ where ptype is the scheduling priority of the type of data corresponding to the queue, as previously defined in the present specification, and a is set at 0 for local queues, and at 1 for relay queues. The queues may then be sorted by their priority index. When a new frame arrives and the queue corresponding to its origin and the type of data is full, the probability to discard a frame from queue $i_{ptype,q}$ is calculated as follows:

$$1 - \left(\frac{i_{ptypeq}}{n*(2n+1)}\right)$$

In a variant of this dropping strategy based on probabilities indexes, more particularly adapted for wireless mesh networks based on 802.11, each type of data, or category, has a specific probability to access the wireless medium that is defined by values called AIFSN and CWmin. In this case, the provability to discard a frame from queue $i_{ptype,q}$ is $$\frac{AIFSN[ptype, q] + CW\min[ptype, q]}{S}$$

Where S represents the total sum of all minimal waiting intervals for a frame to access the wireless medium, with $$S = \sum_{k=1}^{k=q} \sum_{i=0}^{i=p} AIFSN[l, k] + CW\min[l, k]$$

Figure 3:
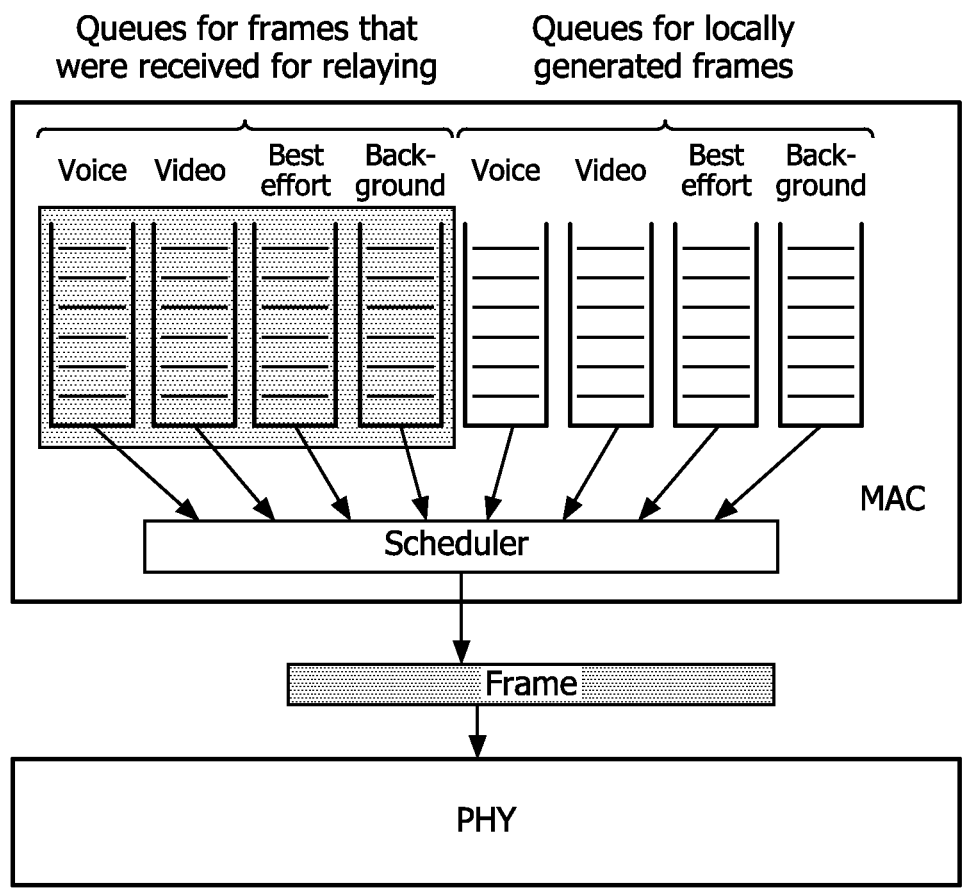

In another example of architecture, shown in FIG. 3, the additional queues are not introduced on top of the MAC layer, but directly within the MAC layer, as a replacement of conventional queues. In such a case, scheduler 12 carries out all the operations performed by scheduler 10 and 11 as described in conjunction with FIG. 2. In such an architecture, frames selected from local queues or relay queues are directly transmitted to a receiving device.

As mentioned previously in the present specification, in existing transmitting methods dealing with multi-hop transmission paths, the probability of frame dropping increases at any additional hops. To balance this phenomenon, and to offer equal performance over all the network, in some example embodiments of the present invention, a hop count is taken into accounts in the different strategies carried out. Thus, for example, the frame dropping probability is decreased for frames with a high hop count, i.e. frames whose transmission is almost completed, so that their likelihood to be successfully forwarded increases. Such a modification is, for example, performed by taking into account the number of hops a frame has already traverse, and/or the number of hops the frame still needs to traverse within the network before reaching its final destination.

It is here recalled that, in a mesh network, a hop corresponds to the transmission of a frame between two adjacent mesh devices.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of wireless mesh networks and which may be used instead of or in addition to features already described herein.

The invention claimed is:

1. A method for transmitting frames from a transmitting mesh device to a receiving mesh device in a mesh network, comprising:
   storing frames received in the transmitting mesh device from a source mesh device and intended for a destination mesh device in a relay queue, the source mesh device and the destination mesh device being different from the transmitting device;
   storing frames generated by the transmitting mesh device in a local queue, different from the relay queue;
   selecting a frame from the relay queue or local queue based on a predetermined scheduling strategy, the scheduling strategy including, when both the relay queue and the local queue contain at least one frame, selecting the oldest frame from the relay queue with a probability equal to p, p being a positive number less than 1, and the oldest frame from the local queue with a probability equal to (1−p); and
   transmitting the selected frame to the receiving mesh device;
   wherein when all of the one or more storage slots of the relay queue are occupied, storing a frame in the relay queue further includes assigning a free storage slot from a local queue to the relay queue, and
   wherein when all local queues are full, said storing a frame in the relay queue further includes: dropping a frame from the local queue; assigning the released storage slot to the relay queue; and storing the frame in the free storage slot of the relay queue.

2. A method as recited in claim 1, wherein selecting a frame further comprises:
   in case one of the queues is empty, selecting the oldest frame from the other queue.

3. A method as recited in claim 1, wherein p is equal to 1.

4. A method as recited in claim 1, wherein the predetermined scheduling strategy takes into account the number of hops a frame in the relay queue has already traversed and/or still has to traverse within the mesh network.

5. A method as recited in claim 1, wherein in case the relay queue and the local queue are defined as software queues each comprising at least one storage slot, and wherein a storage slot can be assigned either to a queue or to another.

6. A method as recited in claim 1, wherein the transmitting mesh device comprises a first set of relay queues, respectively a second set of local queues, and wherein the received frames, respectively the generated frames, are stored in any queue of the first set, respectively the second set.

7. A method as recited in claim 6, wherein the received frames, respectively the generated frames, are stored in one queue of the first set, respectively of the second set, depending on the type of data contained in the frame.

8. A method as recited in claim 7, wherein the predetermined scheduling comprises selecting, for each type of data, the oldest frame from the relay queue corresponding to the type of data with a probability $p_{type}$, wherein $p_{type}$ is a positive number depending on the type.

9. A method as recited in claim 8, wherein the predetermined scheduling strategy is such that the number of packets of a single type of data sent in a row does not exceed a predetermined number.

10. A method as recited in claim 1, wherein the relay queue and the local queue are placed on top of the MAC layer of the mesh network, and wherein the transmitting comprises:
    transferring the frame for the relay queue or local queue to a final queue in the MAC layer of the network, and
    transmitting the frame from the final queue to another mesh device.

11. A mesh device for transmitting or receiving frames in a wireless mesh network, comprising:
    means for receiving frames from a source mesh device, intended for a destination mesh device;
    means for generating frames;
    means for transmitting frames;
    first storage means for storing received frames;
    second storage means for storing generated frames; and
    a scheduler for selecting, from first storage means and second storage means, frames to be transmitted, the scheduler being configured to select an oldest frame from the first storage means with a probability equal to p, p being a positive number less than 1, and an oldest frame from the second storage means with a probability equal to (1−p) when the first storage means and the second storage means both contain at least one frame;
    said scheduler operating according to a scheduling strategy comprising:
    when all of the one or more storage slots of the relay queue are occupied, storing a frame in the relay queue further includes assigning a free storage slot from a local queue to the relay queue, and
    when all local queues are full, said storing a frame in the relay queue further includes: dropping a frame from the local queue; assigning the released storage slot to the relay queue; and storing the frame in the free storage slot of the relay queue.

12. A method for transmitting frames from a transmitting mesh device to a receiving mesh device in a mesh network, comprising:
    storing frames received in the transmitting mesh device from a source mesh device and intended for a destination mesh device in a relay queue, the relay queue being a software queue comprising one or more storage slots, the source mesh device and the destination mesh device being different from the transmitting device;
    storing frames generated by the transmitting mesh device in a local queue, the local queue being a software queue different from the relay queue and comprising at least one storage slot;
    selecting a frame from the relay queue or local queue based on a predetermined scheduling strategy; and
    transmitting the selected frame to the receiving mesh device;
    wherein when all of the one or more storage slots of the relay queue are occupied, storing a frame in the relay queue further includes assigning a free storage slot from a local queue to the relay queue, and
    wherein when all local queues are full, said storing a frame in the relay queue further includes: dropping a frame from the local queue; assigning the released storage slot to the relay queue; and storing the frame in the free storage slot of the relay queue.

* * * * *